United States Patent [19]

Rigdon et al.

[11] 3,775,275

[45] Nov. 27, 1973

[54] PHOTONITROSATION OF NORMAL PARAFFINS

[75] Inventors: Orville W. Rigdon, Groves; Robert S. Edwards; Edward H. Holst, both of Nederland, all of Tex.

[73] Assignee: Texaco Inc., New York, N.Y.

[22] Filed: May 6, 1971

[21] Appl. No.: 141,036

Related U.S. Application Data

[63] Continuation-in-part of Ser. No. 124,473, March 15, 1971, Pat. No. 3,717,561, which is a continuation-in-part of Ser. No. 674,612, Oct. 11, 1967, Pat. No. 3,578,575.

[52] U.S. Cl. ..................... 204/162 XN, 204/163 R
[51] Int. Cl. ............................................... B01j 1/10
[58] Field of Search .................. 204/162 XN, 163 R

[56] References Cited
UNITED STATES PATENTS

| | | |
|---|---|---|
| R25,937 | 12/1965 | Ito .............................. 204/162 XN |
| 3,048,634 | 8/1862 | Mueller et al. ............... 204/162 XN |
| 3,129,155 | 4/1964 | Ito et al. ...................... 204/162 XN |

*Primary Examiner*—Benjamin R. Padgett
*Attorney*—Thomas H. Wahley and Carl G. Ries

[57] ABSTRACT

A process for producing normal paraffin oximes and, in particular, normal paraffin oximes having from 14 to 50 carbon atoms wherein a $C_{14}$ to $C_{50}$ normal paraffin is photochemically reacted in the presence of a halogenated organic solvent with a nitrosating agent under the influence of light in the wavelength of 200 to 760 millimicrons and contacting the reaction product with a polybasic acid such as sulphuric or phosphoric acid. The oximes are subsequently recovered by neutralizing the acid treated product and separating the oxime.

18 Claims, No Drawings

PHOTONITROSATION OF NORMAL PARAFFINS

CROSS REFERENCES TO RELATED APPLICATIONS

This application is a continuation-in-part of our copending application heretofore filed on Mar. 15, 1971 as Ser. No. 124,473, now U.S. Pat. No. 3,717,561 entitled PHOTONITROSATION OF NORMAL PARAFFINS which in turn is a continuation-in-part of copending application Ser. No. 674,612, filed Oct. 11, 1967, now U.S. Pat. No. 3,578,575 entitled PHOTONITROSATION OF NORMAL PARAFFINS.

BACKGROUND OF THE INVENTION

This invention relates to a process for producing oximes. In particular this invention relates to the manufacture of higher molecular weight oximes by photochemically reacting a higher molecular weight normal paraffin and a nitrosation agent.

In our related applications recited above we have described the preparation of $C_{10}$ to $C_{13}$ paraffin oximes by contacting $C_{10}$ to $C_{10}$ normal paraffins with a nitrosating agent where the photolytic reaction is conducted under the influence of a light in the wavelength of 200 to 760 millimicrons. The photolytic reaction and processes described in our previous disclosures while highly successful with regard to normal paraffins having from 10 to 13 carbon atoms have presented unexpected difficulties in the instance where normal paraffins having from 14 to 50 carbon atoms are sought to be converted. In particular, photonitrosation of the $C_{14}$ and higher n-paraffins produces an oxime-acid salt that is highly soluble in the n-paraffin reactant. In those instances where normally solid n-paraffins are sought to be converted, higher operating temperatures above their melting point are indicated which in turn increases the product's solubility in the n-paraffin reactant. Consequently, in each instance spontaneous separation of the product from the reaction zone fails to occur leading to further oxidation and halogenation of the product ultimately resulting in low yields and low selectivity to the corresponding desired oximes. From a commercial aspect the processes are not only economically unattractive, but impractical.

It is therefore an object of this invention to provide an efficient process for the preparation of oximes from $C_{14}$ to $C_{50}$ normal paraffins.

Another object of this invention is to provide a process for the preparation of oximes from $C_{14}$ to $C_{50}$ normal paraffins in high yields.

Yet another object of this invention is to provide a process having high selectivity for the preparation of $C_{14}$ to $C_{50}$ oximes from normal paraffins.

Other objects and advantages will become apparent from a reading of the following detailed description and examples.

SUMMARY OF THE INVENTION

Broadly, this invention contemplates a process for the manufacture of normal paraffin oximes which comprises:

a. photochemically reacting in the presence of a halogenated organic solvent a normal paraffin having from 14 to 50 carbon atoms with a nitrosating agent under the influence of light in the wavelength range of 200 to 760 millimicrons;

b. contacting the reaction mixture of (a) with a concentrated polybasic acid and recovering the oxime-acid salt of said polybasic acid;

c. neutralizing said oxime-acid salt of (b); and d. separating and recovering a $C_{14}$ to $C_{50}$ normal paraffin oxime.

The normal paraffins contemplated in this invention are straight chain aliphatic hydrocarbons containing at least 14 and up to 50 carbon atoms and particularly n-paraffins having from 14 to 35 carbon atoms. Such hydrocarbons include for example n-tetradecane, n-pentadecane, n-hexadecane, n-octadecane, n-nonadecane, n-eicosane, n-heneicosane, n-docosane, n-pentacosane, n-triacontane, n-pentriacontane, n-tetracontane, n-pentratetracontane, n-pentacontane and mixtures thereof. Typical paraffin hydrocarbon mixtures applicable to this invention include, hydrocarbon mixtures comprising $C_{14}$ to $C_{26}$ n-paraffins obtained from urea dewaxing of middle distillates and $C_{17}$ to $C_{35}$ n-paraffins obtained from refined wax.

Applicable nitrosation agents or components of nitrosating mixtures include nitrosyl halides, nitrosyl sulfuric acid, nitrogen oxide and chlorine and nitrogen peroxide and chlorine. Mixed nitrosating agents such as nitrogen oxide and chlorine or nitrogen peroxide and chlorine can be employed in molar ratios ranging from 3:1 to about 1:1. Further, the nitrosating agent may be used in admixture with hydrogen chloride and inert gases such as nitrogen may be introduced to the photolytic reaction.

An important aspect of this invention relates to the use of a solvent during the photolytic reaction. The solvent employed must be one that is inert to the reaction. In addition the solvent must be capable of solubilizing those n-paraffins which are usually solids at the conversion temperature employed thereby permitting the reactants to be bathed in light of the designated wavelengths. Of utmost importance, the solvent must permit the oxime-acid salt product to be spontaneously separated therefrom so as to preclude further oxidation and halogenation of the same. While many hydrocarbons meet some of the requirements above, including aromatics such as benzene, which solubilize the higher n-paraffins and permit the photolytic reaction to take place, they nevertheless cannot be employed inasmuch as the oxime-acid salt is likewise soluble therein and renders inoperative the subsequent separation technique more fully described below.

It has been found that halogenated hydrocarbons can be employed as the reaction solvent in the instant process meeting all the requirements set forth above. Illustrative of the halogenated organic solvents contemplated herein we mention chlorided and fluorided hydrocarbons including carbon tetrachloride, chloroform, tetrachloroethane, pentachloroethane and perfluorocarbons. In general the solvents employed are those which are normally liquid at a temperature in the range of from 30° to 140°F. The $C_{14}$ to $C_{50}$ n-paraffin concentration in the solvent can vary from 10 to 95 weight percent and preferably from about 30 to 80 weight percent. The photochemical reaction is carried under a partial pressure of nitrosating agent ranging from 50 to 700 and preferably between 200 and 600 mm. Hg.

In another embodiment related to the high conversion of the $C_{14}$ to $C_{50}$ normal paraffin to the corresponding oxime, the reaction is permitted to proceed under the influence of light of selected wavelengths influencing both oxime selectivity and yield. Specifically we employ wavelengths of from 200 to 760 millimicrons and preferably wavelengths of from about 400 to 700 millimicrons. Conducting the photolytic reaction under the influence of light including wavelengths below 200 millimicrons results in lower oxime selectivities along with by-product formation such as ketones. By employing light in the wavelength range recited above, by-product formation is deterred and the process has high selectivity and yield to the desired oxime product.

Light in the wavelengths recited above may be provided to the reaction zone in a number of ways. In a highly preferred embodiment a sodium arc lamp is employed as the source of light where essentially all emission is at a wavelength of from about 380 millimicrons to about 760 millimicrons. The use of the visible radiation is desirable for photonitrosation in view of the higher quantum count, that is photons per watt, which in turn provides increased oxime production. In addition to minimizing by-product formation during photonitrosation of the n-paraffins, the sodium arc lamp permits greater photonitrosation efficiency by converting more of the electrical power consumed to light having the specified wavelength. In a particularly desirably embodiment at least 50 percent of the emission of the sodium lamp emits wavelengths from about 550 to 650 millimicrons. Alternatively, and in place of the sodium arc lamp, any source producing light in the wavelength range of 200 to 760 millimicrons may be employed including mercury arc, thallium arc, cadmium arc, carbon arc, rare gas arcs such as neon and xenon and tungsten incandescent lamps. Sunlight can also be employed. When employing such other sources of light, wavelengths less than 200 millimicrons are excluded from influencing the reaction by means of filters interposed between the reaction zone and source of light. For example, various glasses capable of inhibiting the passage of undesired wavelengths may be employed, that is, the reaction walls may consist of such materials or a glass filter may be interposed between the light source and reaction zone. Among the filtering glasses which may be employed we mentioned Pyrex 7740, Corning glass numbers 0160, 7380, 3850, Corex 9700 and in general those glasses inhibiting ultraviolet light transmission of wavelengths below 200 millimicrons.

An additional feature beneficially influencing yield and selectivity relates to the use of a polybasic acid such as sulfuric and phosphoric acid flowing along the surface of the reaction vessel. We have found it advantageous to contemporaneously provide an intermittent or continuous flow of minor amounts of sulfuric or phosphoric acid over the reactor wall, particularly the light transmitting wall. Such a flow materially assists inhibiting byproduct deposition on the reaction wall which would otherwise interfere with the transmission of actinic light. Not all concentrations of sulfuric or phosphoric acid are beneficial however, and we employ concentrated sulfuric or phosphoric acid and particularly acids of from 85 to 98 percent. Employing dilute acids, that is, 4 to 20 percent sulfuric acid, prevents the photolytic reaction from occurring to a significant extent whereas fuming sulfuric acid suppresses oxime formation with resulting ketone and amide formation.

In the present process a polybasic acid such as sulfuric or phosphoric acid, in addition to inhibiting deposition on the light transmitting wall, is employed in combination with the halogenated organic solvent as the means for separating the oxime-acid salt product from the reactants or reaction zone. In the absence of the halogenated organic solvent, attempts to extract the crude oximes from the reaction mixture by contacting with concentrated sulfuric acid failed to provide a phase separation on prolonged standing thereby indicating that oxime-sulfuric acid salts are soluble in the n-paraffin reactant. To separate the crude oxime-acid salts formed in the course of the photolytic reaction from solution in halogenated organic solvent-n-paraffin reaction mixture, reagent amounts of polybasic acid are employed, that is, stoichiometric amounts are needed to convert the oxime hydrochlorides formed as the principal product of the photolytic reaction to the corresponding oxime-acid salt of sulfuric or phosphoric acid. The oxime-polybasic acid salt in turn possesses limited solubility in the solvent-paraffin mixture and there results spontaneous product separation from the reaction zone or reaction mixture.

In accordance with our invention the oxime is prepared by admixing a nitrosating agent, such as a nitrosyl halide, illustrated by nitrosyl chloride, preferably with nitrogen and hydrogen chloride as diluent gases. The nitrosating agent or mixture is next contacted with a $C_{14}$ to $C_{50}$ n-paraffin in the halogenated organic solvent medium at a temperature ranging from about 30° to 140°F, preferably at temperature of 50° to 90°F., in the presence of a concentrated polybasic acid, preferably sulfuric acid, flowing along the reactor surface, and actinic light having wavelengths of from 200 to 760 millimicrons. In operation the conversion product comprises the n-paraffin oxime salt of hydrochloric acid. To achieve maximum light utilization the n-paraffin is exposed to a light source contained in a glass water-cooled immersion well. Under the operative conditions, the oxime hydrochlorides are soluble in reaction medium, and are removed from the reaction zone by contacting with the concentrated polybasic acid ,sulfuric or phosphoric acid, thereby converting the oxime hydrochlorides to oxime-acid salts of sulfuric or phosphoric acid. These oxime-acid salts spontaneously separate from the n-paraffin-halogenated organic solvent reaction medium and precipitate to the bottom of the reaction vessel where they may be continuously removed. The total polybasic acid charge employed for separating the oxime-polybasic acid salt includes the amount used in the immersion well wash of the photoreactor. The total polybasic acid charge therefore consists of acid from the immersion well wash plus fresh acid added to make up the total reagent amount. In operation the photolytic reaction may be conducted in a batchwise or continuous operation and in either instance it is desirable that no more than 25 percent of the paraffin be converted to the oxime hydrochloride prior to contacting with the polybasic acid to effect separation of the reaction product from the photoreaction zone. To insure good quality oximes free of substantial amount of by-products, our process is best conducted at paraffin conversion levels not exceeding 25 weight percent and preferably at conversion levels of about 5 to 10 weight percent to the corresponding oxime hydrochloride. In batchwise operations this may be accomplished by permitting the reaction to proceed until paraffin conversion to oxime hydrochloride has reached the 25 percent level and the reaction medium is thereafter contacted with the stoichiometric amount of concentrated polybasic acid. In continuous operations, the polybasic acid is simultaneously introduced to the reaction zone thereby permitting spontaneous product separation to occur.

Following photonitrosation, the reaction effluent is degassed, preferably under vacuum, and any unreacted gaseous nitrosating agent is recovered and recycled to the reaction. The degassed reaction effluent is subsequently extracted with a low boiling hydrocarbon such as cyclohexane, n-pentane, low petroleum ether or iso-heptane to remove unreacted n-paraffins. In continuous operations the unreacted paraffins may be recycled to the nitrosator. The paraffin denuded effluent is thereafter neutralized by contacting with, for example, gaseous or aqueous ammonia at a temperature ranging from about 30° to 140°F. and preferably from 60° to 110°F. thereby separating the oxime along with aqueous ammonium sulfate. Ammonia addition should be regulated so that the maximum pH of the mixture does not exceed 6. At pH's above 6, much longer separation times are required and at pH's of 7 and higher, severe emulsion problems are encountered.

Approximately three volumes of low boiling hydrocarbon of the type mentioned above are mixed with the salts during the neutralization to facilitate the separation of the oximes from the aqueous phase. Substantially all of the inorganic salts from the neutralization are contained in the aqueous phase and additional water washing may be employed to remove the remainder of the inorganic salts. The hydrocarbon phase from neutralization contains the oximes along with minor amounts of by-product. The oxime may be recovered by blotter filtration and evaporation of the hydrocarbon under reduced pressure. Where desired, the hydrocarbon can be condensed and recycled for reintroduction to the extraction or neutralization stages.

Oximes produced in this manner from $C_{14}$ to $C_{50}$ n-paraffins are valuable as emulsifiers for soluble oil, emulsifiers for paints, drilling mud dispersants and ore flotation agents. Moreover, the oximes may be hydrogenated to amines or converted to amides by Beckmann rearrangement as well as to various other derivatives as by reaction with ethylene oxide to ethoxylates and with ethylene imine to ethaminates. Further, the oximes may be hydrolyzed to yield ketones which are in turn hydrogenated to yield secondary alcohols.

In the following examples the apparatus employed to photonitrosate $C_{14}$ and higher n-paraffins consisted of a 12 liter flask equipped with a quartz immersion well containing a 550 watt high pressure mercury arc lamp. The immersion well was water jacketed to provide cooling to the lamp. A glass tubing containing a terminal fritted glass gas dispersion tip was used to deliver reactant gases to the bottom of the immersion well. Product and acid layer removal was accomplished by pumping off from the bottom of the reactor. Cooling of the normal paraffin phase was accomplished by circulation through a laboratory condenser connected to a chilled water circulation pump. Unreacted vent gases were led to a caustic scrubber. A glass sparging ring located near the top of the immersion well was used to deliver a film of acid to the immersion well surface for cleaning purposes. Charging funnels were used to supply normal paraffins alone or in admixture with solvents and fresh acid as needed.

When n-paraffins were charged in the absence of solvent, the wax was melted and the charging funnel wrapped with electrical heating tape set to maintain a temperature of approximately 140°F. Heating of the waxy normal paraffin phase in the reactor in the absence of solvent, along with removal lines, pump heads and vessels was accomplished by heating tapes and immersing the 12 liter flask in a conventional insulated laboratory bath containing a copper coil for circulation of warm water. In all instances the melted n-paraffin or paraffin-solvent mixture was charged to the photoreactor until the level reached the top of the light source. The sulfuric acid solution used for cleaning the immersion well surface was added to the reaction flask to a level just below the fritted glass dispersion tip. Cooling water to the immersion well jacket was started as well as heating of the insulated laboratory bath containing a 12 liter flask. After attaining an operating temperature of 140°F., the mercury arc lamp was turned on and allowed to reach full operating intensity before introducing the nitrosating gas mixture consisting of nitrosyl chloride and hydrogen chloride. Circulation of the bottom acid layer through the glass sparging ring was then started and adjusted so as to provide an even wash film on the immersion well. The reaction was terminated by turning off the mercury arc lamp, ceasing the introduction of reactants and allowing sufficient time for complete settling of the oxime salts. Examples utilizing mercury arc lamps employed a Pyrex 7740 glass tube of 2 millimeters thickness to provide the filtered light of the desired wavelengths. Approximately 60 milliliters of 98 percent sulfuric acid per hour were sparged onto the immersion well surface at 30 minute intervals for 3 to 5 minutes, this amount being sufficient to maintain an optically clean surface at all times.

EXAMPLE I

A $C_{19} - C_{33}$ refined wax having an n-paraffin composition expressed in weight percent as follows:

| | |
|---|---|
| $C_{19}$ — 0.2 | $C_{26}$ — 12.8 |
| $C_{20}$ — 1.4 | $C_{27}$ — 9.4 |
| $C_{21}$ — 5.9 | $C_{28}$ — 5.5 |
| $C_{22}$ — 11.9 | $C_{29}$ — 3.3 |
| $C_{23}$ — 14.7 | $C_{30}$ — 2.1 |
| $C_{24}$ — 17.0 | $C_{31}$ — 0.9 |
| $C_{25}$ — 14.2 | $C_{32}$ — 0.5 |
| | $C_{33}$ — 0.2 | was pretreated by washing with concentrated (95–98%) sulfuric acid. The wax was melted by heating to 140°F. and added to the reactor in the absence of a solvent. The mercury arc lamp was turned on and a nitrosating gas mixture consisting of nitrosyl chloride and hydrogen chloride was introduced at rates respectively of 1.65 grams per minute and 1.32 grams per minute. A small amount of concenteated sulfuric acid was delivered to the immersion well to provide a wet surface prior to the accumulation of appreciable products and was thereafter delivered at approximately 60 milliliters per hour. After operating for about one-half hour, the waxy parafin phase became turbid. No product phase was observed until after 2 hours had elapsed whereupon oily product globules settled to the reactor bottom along with sulfuric acid used as the immersion well wash. The combination product and acid layer was allowed to accumulate to a depth of approximately three-fourths inch in the reactor bottom and then pumped off. The procedure was repeated periodically and the run duration was for a total of 32.9 hours. A total of 3274 grams of nitrosyl chloride, 2,900 grams of hydrogen chloride, 10,736 grams of wax and 3,359 grams of sulfuric acid were employed during the reaction. The reaction was terminated by turning off the mercury arc lamp and gases and allowing sufficient time for complete settling of the oxime salts. The product and acid layer remaining in the reaction vessel was then pumped off and worked up with that removed during the run. The results from the photonitrosation reaction showed that spontaneous separation of crude product was very slow when the photochemical reaction was conducted in the absence of a solvent and the anticipated crude product separation rate of 4.6 grams per minute was not realized but instead the formation rate was observed to be 1.56 grams per minute.

The crude photonitrosation product was neutralized by treating with aqueous ammonia. Infrared analysis indicated that oximes were present only to the extent of about 5 to 10 weight percent. Active bands attributed to ketones and nitroso compounds were also observed in the infrared spectrum. The data strongly indicated that although oximes were formed in the primary photochemical reaction, the oxime-acid salts were sufficiently soluble to remain in solution where they were subjected to further attack by nitrosyl chloride at the elevated reaction temperature. As such the process was from a commercial aspect unattractive.

EXAMPLE II

The acid treated refined wax of Example I was mixed with benzene such that the mixture was composed of 30 weight percent wax totaling 10,747 grams. Hydrogen chloride and nitrosyl chloride were charged to the reactor at the respective rates of 1.64 and 1.93 grams per minute and the reaction was conducted at a temperature of 80°F. for a run duration of 33.6 hours where a total of 3,400 grams of hydrogen chloride, 3,901 grams of nitrosyl chloride and 2,378 grams of concentrated phosphoric acid were introduced as immersion well wash. Spontaneous product separation was not observed in the photonitrosation run and the run was terminated by turning off the mercury arc lamp and gases.

An attempt was made to partition the crude waxy oximes from reaction mixture by contacting with concentrated sulfuric acid. Approximately 1 liter (842 grams) of the mixture from the photoreactor was vigorously stirred with 196 grams of 95–98% sulfuric acid at 85°F. for 1 hour and the mixture was permitted to stand. No evidence of phase separation after prolonged standing was observed indicating the oxime-sulfuric acid salt to be soluble in the benzene reaction mixture. Attempts to effectuate separation by the addition of small amounts of water were unsuccessful and resulted in severe emulsion formation. Another run using the same procedure employing concentrated phosphoric acid yielded the same results observed with concentrated sulfuric acid. A portion of the benzene-wax product mixture (500 grams) was stirred with 300 grams of sodium bicarbonate, 1,000 cc. of deionized water and 500 cc. of heptane at 140°F. The neutralized product mixture was separated from the aqueous phase, dried and evaporated to constant weight under reduced pressure at 140°F. The crude oxime content of the recovered product was of poor quality and contained numerous compounds other than oximes. The product was estimated by infrared analysis and elemental nitrogen analysis to be about 30 to 40 weight percent oxime formed at the low formation rate of approximately 0.6 grams per minute.

EXAMPLE III

The acid treated refined wax of Example I was mixed with carbon tetrachloride such that the mixture was composed of 30 weight percent wax totaling 13,593 grams. Hydrogen chloride and nitrosyl chloride were charged to the reactor at the respective rates of 1.01 and 1.92 grams per minute and the reaction was conducted at a temperature of 80°F for a run duration of 11.7 hours. A total of 2,085 grams of concentrated phosphoric acid as well wash was used along with 705 grams of hydrogen chloride and 1,351 grams of nitrosyl chloride. Spontaneous product separation was not observed during the photonitrosation reaction.

To 1,069 grams of the product maintained at about 100°F. there was slowly added 196 grams of concentrated sulfuric acid. The mixture was stirred and allowed to settle whereupon the bottom acid-oxime phase separated cleanly, was drawn off and neutralized by contacting with 350 grams of sodium bicarbonate in one liter of water. A liter of heptane was added to facilitate separation and the neutralized product was dried at 140°F. Basis infrared and elemental nitrogen analysis, 2,390 grams of oximes formed at the rate of approximately 3.4 grams per minute.

EXAMPLE IV

An acid treated n-paraffin wax from middle distillate dewaxing having a composition expressed in weight percent as follows:

| | |
|---|---|
| $C_{13}$ — 0.1 | $C_{20}$ — 13.4 |
| $C_{14}$ — 0.4 | $C_{21}$ — 12.0 |
| $C_{15}$ — 1.6 | $C_{22}$ — 8.2 |
| $C_{16}$ — 7.8 | $C_{23}$ — 3.9 |
| $C_{17}$ — 14.7 | $C_{24}$ — 1.8 |
| $C_{18}$ — 18.6 | $C_{25}$ — 0.8 |
| $C_{19}$ — 16.6 | $C_{26}$ — 0.1 | was pretreated by washing with concentrated (95–98%) sulfuric acid. The apparatus used to photonitrosate the wax in this example was equipped with a 400 watt Lucalox sodium arc lamp ("Lucalox" is a registered Trademark), having light emissions ranging from 380 to 760 millimicrons. The reactor had a capacity of about ten gallons and was equipped with a bottom drawoff to facilitate product removal. The acid treated wax was mixed with carbon tetrachloride such that the mixture was composed of 50 weight percent wax totaling 70,411 grams. A total of 5,480 grams of nitrosyl chloride, 3,660 grams of hydrogen and 1,550 grams of concentrated sulfuric acid were charged to the reactor over a period of about 39.5 hours and the reaction was conducted at a temperature of 65° to 77°F. The concentrated sulfuric acid immersion well was set to deliver approximately 50 cc of acid at 1 hour intervals. The photoreaction was allowed to proceed until approximately 5 to 10 weight percent n-paraffin conversion was achieved. The crude oxime product was then recovered by adding 1,500 to 2,500 grams portions of sulfuric acid including the amount used for the immersion well wash. After vigorously agitating the mixture followed by a fifteen minute settling period, the extracted oxime and sulfuric acid phase settled cleanly and was withdrawn as the lower layer. The upper layer was composed of paraffin and carbon tetrachloride.

The process was repeated and the extracted paraffin solvent phase returned to the photoreactor along with fresh charge and conversion and extraction continued. The effluent from the reactor was degassed and the dissolved gases, nitrosyl chloride and hydrogen chloride, liberated and absorbed in a caustic scrubber. The crude degassed mixture of oximes and sulfuric acid was feed of dissolved n-paraffins by extracting three times with equal volumes of heptane. The crude oxime-sulfuric acid mixture was neutralized by adding concentrated ammonium hydroxide in an amount equal to approximately 0.6 by weight of the crude charge with the pH adjusted to about 5–6. Ice was added to maintain the temperature below 110°F. The neutralized mixture was allowed to settle and the bottom water layer was drawn off. The remaining organic layer was mixed with water and the organic layer consisting of heptanes and neutralized oximes filtered and the heptane removed by rotary evaporation under reduced pressure at 120°–130°F. Analysis of the product revealed that the oximes formed at the rate of 6.4 grams per minute and the product consisted of the following on a weight percent basis: 85.42 oximes, 2.36 ketones, 2.17 paraffins and 10.05 resinous material.

We claim:
1. A process for the manufacture of normal paraffin oximes which comprises:
  a. photochemically reacting in the presence of a halogenated organic solvent, wherein said solvent comprises chlorided and fluorided hydrocarbons which are liquids at a temperature in the range from 30° to 140°F., a normal paraffin having from 14 to 50 carbon atoms with a nitrosating agent selected from the group consisting of nitrosyl halides nitrosyl sulfuric acid, nitrogen oxide and chlorine, nitrogen peroxide and chlorine, each alone and in admixture with hydrogen chloride, where said nitrosating agent partial pressure is from about 50 to 700 mm. Hg., under the influence of light in the wavelength range of 200 to 760 millimicrons;
  b. contacting the reaction mixture of (a) with a concentrated polybasic acid and recovering the oxime-acid salt of said polybasic acid;
  c. neutralizing said oxime-acid salt of (b); and
  d. separating and recovering a $C_{14}$ to $C_{50}$ normal paraffin oxime.

2. A process according to claim 1 wherein said solvent is carbon tetrachloride.

3. A process according to claim 1 wherein said solvent is chloroform.

4. A process according to claim 1 wherein said solvent is tetrachloroethane.

5. A process according to claim 1 wherein said solvent is pentrachloroethane.

6. A process according to claim 1 wherein the concentration of said paraffin in said solvent is from 10 to 95 weight percent.

7. A process according to claim 1 wherein the concentration of said paraffin in said solvent is from 30 to 80 weight percent.

8. A process according to claim 1 wherein step (a) is conducted at a temperature of from 30° to 140°F.

9. A process according to claim 1 wherein step (a) is conducted at a temperature of from 50° to 90°F.

10. A process according to claim 1 wherein said wavelength range is from 400 to 700 millimicrons.

11. A process according to claim 1 wherein light from a sodium arc lamp is employed.

12. A process according to claim 1 wherein said polybasic acid is sulfuric acid.

13. A process according to claim 1 wherein said polybasic acid is phosphoric acid.

14. A process according to claim 1 wherein step (a) is conducted at a paraffin conversion level not exceeding 25 weight percent.

15. A process according to claim 1 wherein said neutralizing in step (c) is conducted at a pH not exceeding 6.

16. A process according to claim 1 wherein step (c) is conducted at a temperature of from 30° to 140°F.

17. A process according to claim 1 wherein said paraffin is a mixture of $C_{14}$ to $C_{26}$ n-paraffin.

18. A process according to claim 1 wherein said paraffin is a mixture of $C_{17}$ to $C_{35}$ n-paraffins.

* * * * *